(12) United States Patent
Nakajima et al.

(10) Patent No.: US 9,256,319 B2
(45) Date of Patent: Feb. 9, 2016

(54) INPUT DEVICE

(71) Applicant: ALPS ELECTRIC CO., LTD., Ota-ku, Tokyo (JP)

(72) Inventors: Satoshi Nakajima, Tokyo (JP); Satoshi Hayasaka, Tokyo (JP); Shinichi Endo, Tokyo (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 316 days.

(21) Appl. No.: 13/926,034

(22) Filed: Jun. 25, 2013

(65) Prior Publication Data

US 2014/0043287 A1    Feb. 13, 2014

(30) Foreign Application Priority Data

Aug. 8, 2012   (JP) ................................ 2012-175482

(51) Int. Cl.
*G06F 3/044*   (2006.01)
*G06F 3/041*   (2006.01)

(52) U.S. Cl.
CPC .............. *G06F 3/0418* (2013.01); *G06F 3/044* (2013.01)

(58) Field of Classification Search
CPC ...... G06F 3/044; G06F 3/0418; G06F 3/0416
USPC ................................... 345/173, 174
See application file for complete search history.

(56) References Cited

U.S. PATENT DOCUMENTS

2013/0176268 A1*   7/2013   Li et al. .......................... 345/174

FOREIGN PATENT DOCUMENTS

JP     2012-48340 JP    3/2012

* cited by examiner

*Primary Examiner* — Kathy Wang-Hurst
*Assistant Examiner* — Jose Soto Lopez
(74) *Attorney, Agent, or Firm* — Hunton & Williams LLP (57) ABSTRACT

Provided is an input device including a coordinate input unit having plural capacitance detection units, a capacitance measurement unit that measures capacitance for each of the plural capacitance detection units, and performs an AD conversion on the measured capacitance to output the converted capacitance as a measurement signal, and a control unit that controls the capacitance measurement unit, calculates a data signal by arithmetically operating the measurement signal, stores the data signal in association with coordinate information of the capacitance detection unit, and outputs a control signal. The control unit calculates a difference value between a predetermined reference value and the data signal at a constant time interval, performs a weighted average process on the data signal and the predetermined reference value to update and store a value on which the process is performed as a new reference value, and changes a weight given to the weighted average process.

2 Claims, 5 Drawing Sheets

AT THE TIME OF TRANSITION OF DATA VALUE OF CONTROL UNIT FOR EACH PROCESS AND PLACEMENT OF FOREIGN MATTER

| | FIRST | SECOND | THIRD | FOURTH | FIFTH | SIXTH | SEVENTH | EIGHTH |
|---|---|---|---|---|---|---|---|---|
| AD VALUE | 768 | 768 | 768 | 768 | 768 | 768 | 768 | 768 |
| BASE VALUE | 256 | 288 | 318 | 346 | 399 | 445 | 485 | 521 |
| DIF_AD VALUE | 512 | 480 | 450 | 422 | 369 | 323 | 283 | 247 |
| DIF_AD-T_ON | 64 | 32 | 2 | -26 | -79 | -125 | -165 | -201 |
| N_BASE | 288 | 318 | 346 | 399 | 445 | 485 | 521 | 552 |
| T_ON | 448 | 448 | 448 | 448 | 448 | 448 | 448 | 448 |

INPUT DEVICE

CLAIM OF PRIORITY

This application contains subject matter related to and claims benefit of Japanese Patent Application No. 2012-175482 filed on Aug. 8, 2012, the entire contents of which is incorporated herein by reference.

BACKGROUND OF THE DISCLOSURE

1. Field of the Disclosure

The present disclosure relates to an input device, and particularly relates to an input device capable of returning from an erroneous detection due to a foreign substance or the like.

2. Description of the Related Art

Conventional capacitance-type input devices can determine an operation position by detecting a change in capacitance accompanied by an operation. However, in such capacitance-type input devices, a change in temperature, for example, causes the detection value thereof to be changed, and thus malfunction may occur.

Figure 5:
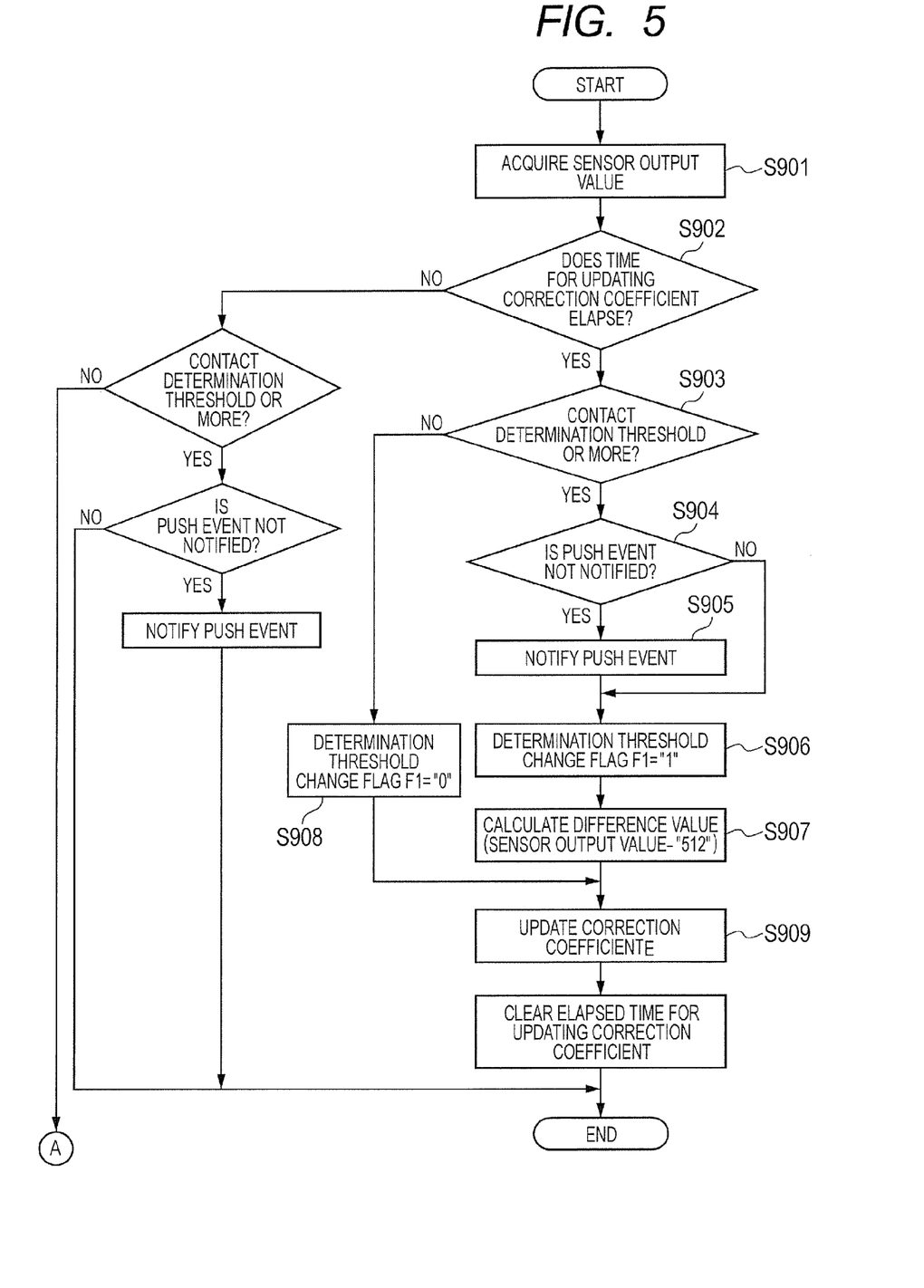
FIG. 5 is a flow diagram illustrating operations of an input device of the related art.

Operations of the input device disclosed in Japanese Unexamined Patent Application Publication No. 2012-048340 will be described with reference to FIG. 5. FIG. 5 is a flow diagram illustrating operations of the input device disclosed in Japanese Unexamined Patent Application Publication No. 2012-048340.

As shown in FIG. 5, sensor output values are acquired periodically (step S901), and it is determined whether a predetermined time serving as conditions for performing a correction coefficient update process has elapsed (step S902). When it is determined that the predetermined time has elapsed (step S902: YES), it is determined whether the sensor output value is equal to or more than a touch determination threshold (step S903). When it is determined that the sensor output value is less than the touch determination threshold (step S903: NO), a determination threshold change flag F1 is set to "0" (step S908), and the process proceeds to step S909.

In step S903, when it is determined that the sensor output value is equal to or more than the touch determination threshold (step S903: YES), it is determined whether event occurrence information composed of identification information is notified (step S904). When it is determined that a push event notification is not performed, a push event is notified (step S905). When the push event is notified, the process proceeds to step S906 as it is. Thereafter, the determination threshold change flag F1 is set to "1" (step S906), and a difference value between the sensor output value and a predetermined reference value ("512" in an example of the related art) is calculated as a correction coefficient A1 (step S907).

Next, a stored correction coefficient is updated (step S909). Thereby, the content of the correction coefficient is updated so that the sensor output value is set to be equal to the predetermined reference value.

As stated above, in order to suppress a malfunction due to a change in temperature, the detection value is replaced by a new reference value when the operation is not detected, and the sensor output value and the predetermined reference value are replaced by new reference values when the operation is detected. With such a configuration, it is possible to suppress the influence of the detection value caused by a fluctuation in capacitance due to the temperature change.

However, when the operation is detected, the difference value between the sensor output value and the predetermined reference value are set to a new correction coefficient, and the correction coefficient is updated. Therefore, a correct operation can be performed following a fluctuation such as the temperature change. However, when a foreign substance such as, for example, hard currency is placed on the input device, and a touch is detected erroneously, there is a problem in that an output signal indicating an operation until the foreign substance is removed is continued and hence the return from the erroneous detection is not possible.

These and other drawbacks exist.

SUMMARY OF THE DISCLOSURE

As an input device that reduces the occurrence of a malfunction caused by a change in temperature, an input device disclosed in Japanese Unexamined Patent Application Publication No. 2012-048340 is proposed. Embodiments of the present disclosure provide an input device capable of returning from an erroneous detection due to a foreign substance or the like.

According to various embodiments, an input device includes: a coordinate input unit, having a plurality of capacitance detection units, which causes an operation body to perform a proximity operation; a capacitance measurement unit that measures capacitance for each of the plurality of capacitance detection units, and performs an AD conversion on the measured capacitance to output the converted capacitance as a measurement signal; and a control unit that controls the capacitance measurement unit, calculates a data signal by arithmetically operating the measurement signal, stores the data signal in association with coordinate information of the capacitance detection unit, and outputs a control signal on the basis of a result of the arithmetic operation. The control unit calculates a difference value between a predetermined reference value and the data signal at a constant time interval, performs a weighted average process on the data signal and the predetermined reference value to update and store a value on which the weighted average process is performed as a new reference value, and changes a weight given to the weighted average process in accordance with the difference value.

In such an input device, the weight may be divided into at least three magnitudes, and the weight may be determined on the basis of a result obtained by comparing the difference value with a touch threshold.

Also, the weight may be set to be large when the difference value is larger than the touch threshold, the difference value may be compared with an abnormal correction detection threshold when the difference value is smaller than the touch threshold, and the weight may be set to be small when the difference value is smaller than the abnormal correction detection threshold.

According to various embodiments, the control unit compares a predetermined reference value with the data signal at a constant time interval, and calculates a weighted average between the data signal and the reference value to update and store the calculated value as a new reference value. For this reason, when a foreign substance or the like is placed on the coordinate input unit, the reference value is continuously corrected by a weighted average, and the reference value comes close to a value of the data signal, thereby allowing an output signal due to an erroneous detection to be stopped. Further, since a weight given to the weighted average is changed in accordance with a change in the data signal and an arithmetic operation is performed, the stabilization of the reference value is achieved by increasing the weighting of the weighted average at the time of the touch detection. In addition, when the reference value continuously corrected is required to be reset by placing a foreign substance on the coordinate input unit and removing the foreign substance after the reference value is continuously updated through the weighted average, the reference value can be reset in a short period of time by decreasing the weighting of the weighted average, and thus it is possible to return to a normal operation quickly.

According to various embodiments, the weight is divided into at least three magnitudes, and the control unit compares the predetermined reference value with the data signal, obtains a difference value therebetween, and determines a weight on the basis of a result obtained by comparing this difference value with the touch threshold. Therefore, it is possible to change a speed at which the reference value is updated in accordance with the detected state.

According to various embodiments, since the weight is determined on the basis of the result of comparing the difference value with the touch threshold and the abnormal correction detection threshold, the speed at which the reference value is updated can be appropriately set on the basis of the operation situation. When the difference value is larger than the touch threshold, the weight increases. Therefore, even when a slow operation is performed, it is possible to stably perform a touch input operation. In addition, when the difference value is smaller than the touch threshold, the weight is determined on the basis of a result obtained by comparing the difference value with the abnormal correction detection threshold. Therefore, it is possible to change the speed at which the reference value is updated in accordance with a process when an abnormality correction is detected. When the difference value is smaller than the abnormal correction detection threshold, the weight decreases. Therefore, it is possible to reset the reference value in a short period of time, and to return to a normal operation quickly.

As stated above, according to embodiments of the present disclosure, it is possible to provide an input device capable of returning from an erroneous detection due to a foreign substance or the like.

DETAILED DESCRIPTION OF THE DISCLOSURE

The following description is intended to convey a thorough understanding of the embodiments described by providing a number of specific embodiments and details involving a pressing force input device. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

Figure 1:
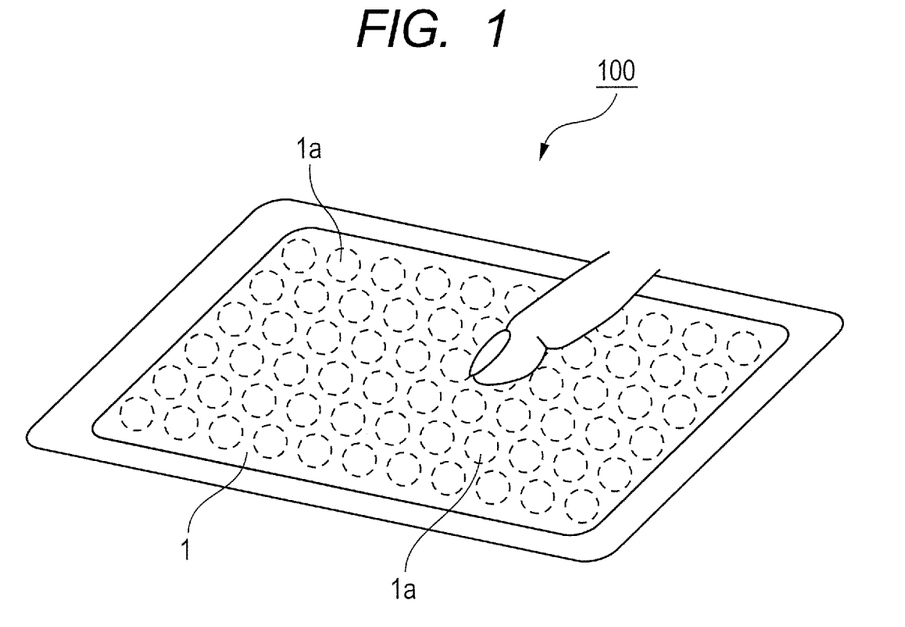
FIG. 1 is a schematic diagram illustrating an external appearance of an input device according to an exemplary embodiment of the present disclosure.
Figure 2:
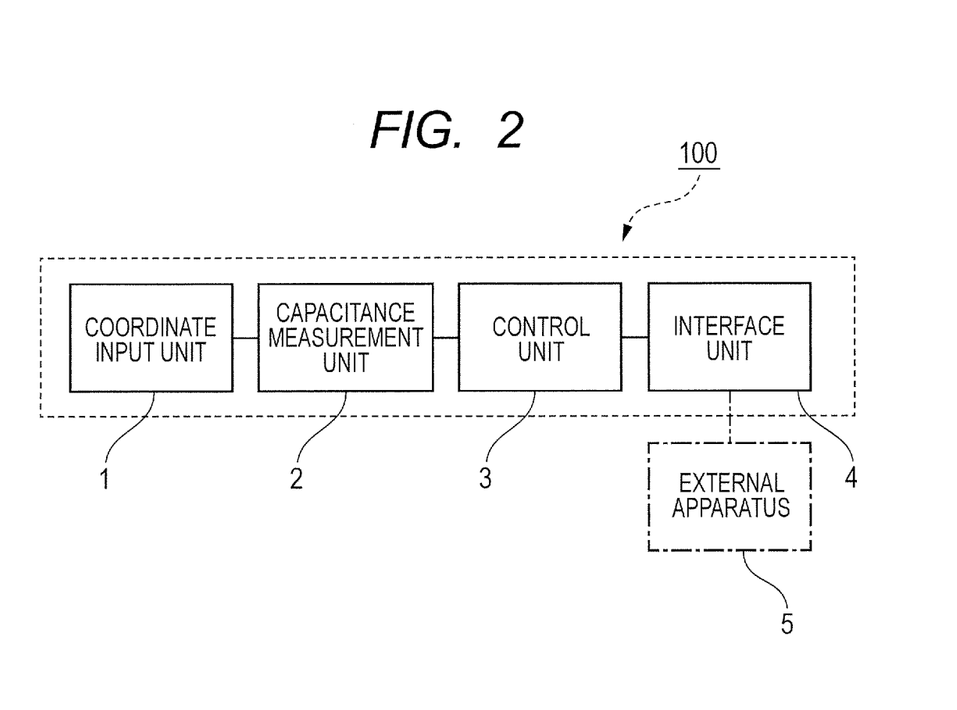
FIG. 2 is a block diagram illustrating a configuration of the input device according to an exemplary embodiment of the present disclosure.

FIG. 1 is a schematic diagram illustrating an external appearance of the input device 100, and FIG. 2 is a block diagram illustrating the configuration of the input device 100.

As shown in FIG. 1, the input device 100 may include a coordinate input unit 1 that may cause an operator to perform an input operation, and may be provided with a plurality of capacitance detection units 1a in the inside thereof along the input operation surface of the coordinate input unit 1.

The capacitance detection unit 1a may have capacitance. When an operator performs an operation in order to touch the coordinate input unit 1, the capacitance of the capacitance detection unit 1a located at a touched position and the periphery thereof may increase.

As shown in FIG. 2, the input device 100 may include the coordinate input unit 1, a capacitance measurement unit 2 connected to the coordinate input unit 1, and a control unit 3 connected to the capacitance measurement unit 2.

The capacitance measurement unit 2 may measure capacitance for each of the plurality of capacitance detection units 1a, and outputs an analog-to-digital conversion signal (ADC signal), obtained by converting the measured capacitance from an analog signal to a digital signal, to the control unit 3 as a measurement signal.

The control unit 3 may control the capacitance measurement unit 2, and acquire the ADC signal for each of the plurality of capacitance detection units 1a. The control unit may store an AD value (data signal) obtained by performing a noise elimination process on the ADC signal in association with coordinate information of the plurality of capacitance detection units 1a, and may output a control signal on the basis of a result obtained by arithmetically operating the AD value.

In addition, the input device 100 may be connected to an external apparatus 5 through an interface unit 4, and may be supplied with operating power of the input device 100 from the external apparatus 5. The input device may output a control signal which may be output from the control unit 3 to the external apparatus 5, and may output a control signal, which may be output from the external apparatus 5 to the input device 100, to the control unit 3.

Figure 3:
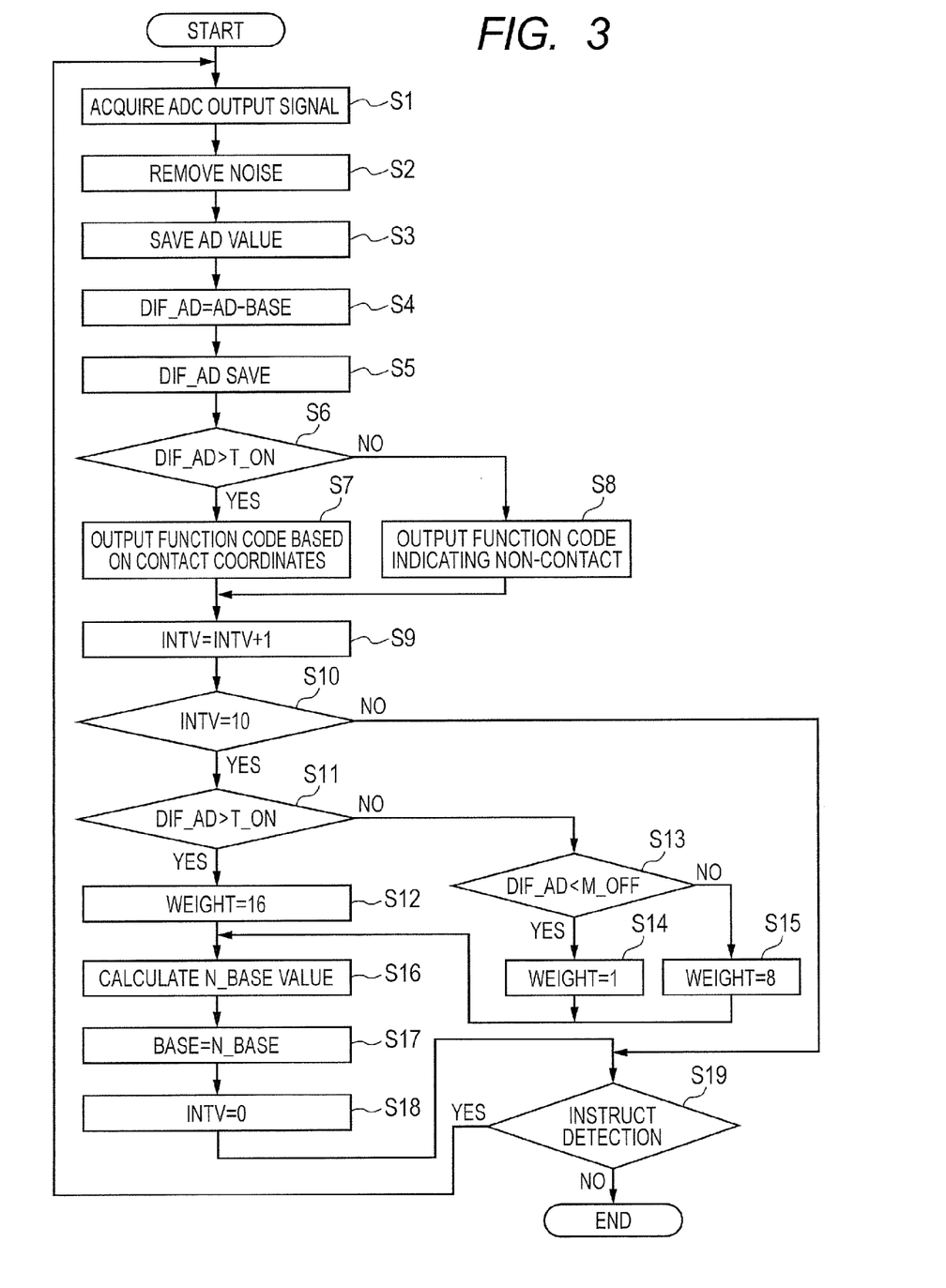
FIG. 3 is a flow diagram illustrating operations of the input device according to an exemplary embodiment of the present disclosure.

Next, operations of the input device 100 will be described with reference to FIG. 3. FIG. 3 is a flow diagram illustrating the operations of the input device 100 according to the embodiment of the present disclosure.

First, as shown in step S1 of FIG. 3, the control unit 3 may control the capacitance measurement unit 2 to acquire an ADC signal. In step S2, an AD value may be obtained by comparing the ADC signal acquired in step S1 with, for example, the ADC signal previously acquired or performing a noise elimination process such as abnormal value exclusion. In step S3, the AD value may be stored (SAVED) in a storage area corresponding to coordinate information for each of the plurality of capacitance detection units 1a having acquired the ADC signal, in a storage device included in the control unit 3.

Next, in step S4, the difference between a predetermined reference value (BASE) and the stored AD value may be calculated to the coordinate input unit 1 as a difference value (DIF_AD) which may be a data signal. In step S5, the difference value (DIF_AD) calculated in step S4 may be stored in a data signal storage area corresponding to coordinate information for each capacitance detection unit 1a having acquired the ADC signal, in the storage device included in the control unit 3.

In step S6, the difference value (DIF_AD) and a touch threshold (T_ON) of a reference for determining the presence or absence of an input operation to the input device 100 may be compared with each other. When the difference value (DIF_AD) is larger than the touch threshold (T_ON), a function code indicating a touch may be output, in step S7, as a control signal from the control unit 3 to the interface unit 4, the process may proceed to step S9. The term "function code" as used herein denotes, for example, a signal for bringing a function of some kind displayed on a screen corresponding to the coordinates into operation.

When the difference value (DIF_AD) is equal to or less than the touch threshold (T_ON) in step S6, a function code indicating a non-touch may be output, in step S8, as a control signal from the control unit 3 to the interface unit 4, and the process proceeds to step S9.

In step S9, 1 may be added to a value of a time interval counter (INTV) measuring a time interval for updating the reference value (BASE), and it may be determined in step S10 whether the value of the time interval counter (INTV) reaches a value indicating a specified time interval.

As a result determined in step S10, when the value of the time interval counter (INTV) reaches the value indicating the specified time interval, the process proceeds to step S11, and when otherwise, the process proceeds to step S19.

In step S11, the difference value (DIF_AD) and the touch threshold (T_ON) of the reference for determining the presence or absence of a touch for the input operation to the input device 100 are compared with each other again. When the difference value (DIF_AD) is larger than the touch threshold (T_ON), the process proceeds to step S12, and when otherwise, the process proceeds to step S13.

In step S12, a weight (WEIGHT) of a weighted average when a new reference value (N_BASE) is calculated may be set to be large (16 in the present example), and the process proceeds to step S16.

In step S13, the difference value (DIF_AD) and an abnormal correction detection threshold (M_OFF) are compared with each other. When the difference value (DIF_AD) is smaller than the abnormal correction detection threshold (M_OFF), the process may proceed to step S14, and when otherwise, the process proceeds to step S15.

In step S14, the weight (WEIGHT) of the weighted average when the new reference value (N_BASE) is calculated may be set to be small (1 in the present example), and the process may proceed to step S16.

In step S15, the weight (WEIGHT) of the weighted average when the new reference value (N_BASE) is calculated may be set to be an intermediate value (8 in the present example) between the large value set in step S12 and the small value set in step S14, and the process may proceed to step S16.

In step S16, the new reference value (N_BASE) may be calculated on the basis of the calculation formula of (Expression 1), using the weight (WEIGHT) of the weighted average which may be set in any of step S12, step S14, and step S15.

$$N\_BASE = ((WEIGHT - 1) \times BASE + AD)/WEIGHT \quad \text{(Expression 1)}$$

In step S17, the new reference value (N_BASE) calculated in step S16 is stored as the reference value (BASE). In step S18, the value of the time interval counter (INTV) may be set to an initial value of "0", and the process may proceed to step S19.

In step S19, when the input operation is performed, a detection instruction from the external apparatus 5 may be input, and an operation may be performed so as to detect the presence or absence of the input operation continuously at a constant time interval returning to step S1. When a detection instruction signal to be output for stopping the input detection from the external apparatus 5 is stopped, the detection may be terminated.

As stated above, the presence or absence of the touch of the coordinate input unit 1 is detected, and a function code corresponding to coordinate information of the capacitance detection unit 1a having detected a touch when the touch is detected and a function code indicating a non-touch when the touch is not detected may be output from the control unit 3 as a control signal.

In addition, the weight (WEIGHT) of the weighted average when the new reference value (N_BASE) is calculated may be set for each constant time interval in accordance with the presence or absence of the touch of the coordinate input unit 1, the new reference value (N_BASE) is calculated on the basis of (Expression 1) using the set weight (WEIGHT) of the weighted average, and the new reference value (N_BASE) is stored as the reference value (BASE). Therefore, it may be possible to suppress the influence of the capacitance caused by a temperature change or the like on the detection value.

Further, when the touch of the coordinate input unit 1 is detected, the weight (WEIGHT) of the weighted average at the time of calculating the new reference value (N_BASE) may be set to a large value. Therefore, even when a slow operation is performed, it may be possible to stably perform a touch input operation.

Next, operations when a foreign substance is placed on the coordinate input unit 1 will be described with reference to FIG. 3 and FIGS. 4A and 4B.

Figure 4A:
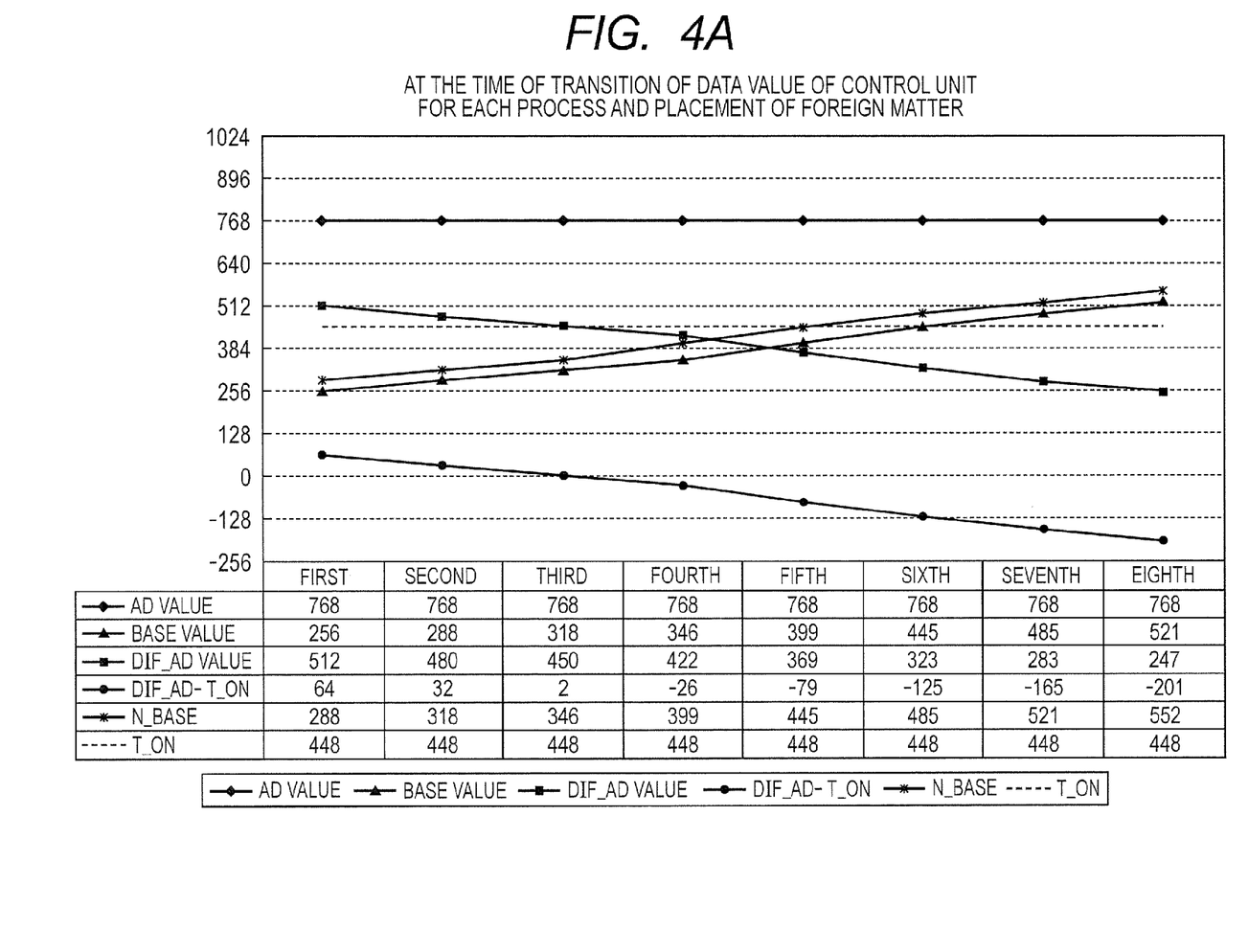
FIGS. 4A and 4B are diagrams illustrating operations of the input device according to an exemplary embodiment of the present disclosure.
Figure 4B:
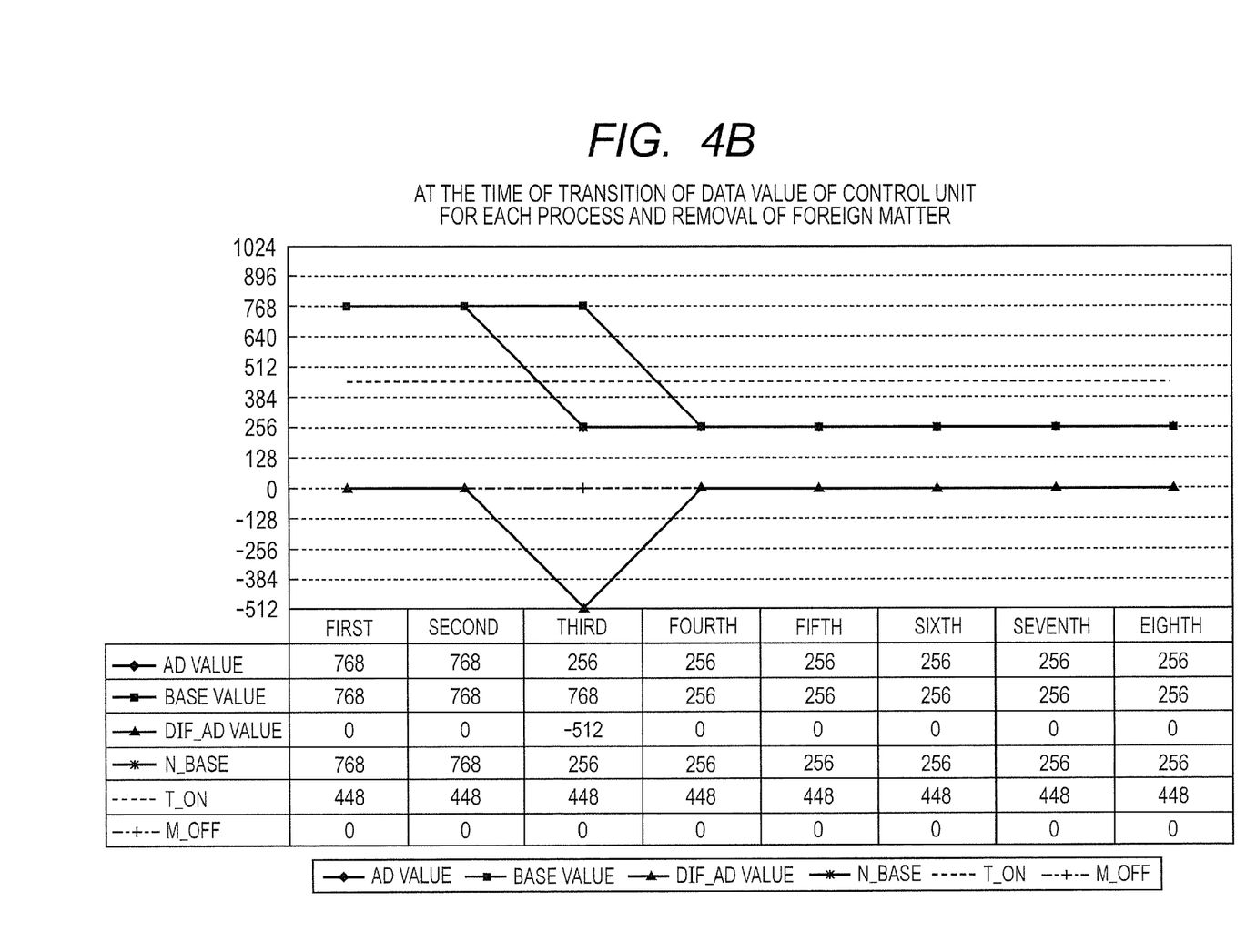

FIGS. 4A and 4B are diagrams illustrating the operations of the input device 100 according to an exemplary embodiment of the present disclosure, and show the transitions of arithmetic operation results of the control unit 3 based on the number of processes of step S11 and subsequent ones of the control flow shown in FIG. 3.

FIG. 4A shows the transitions of arithmetic operation results of the AD value, the reference value (BASE), the difference value (DIF_AD), and the new reference value (N_BASE) of the control unit 3 based on the number of processes of step S11 and subsequent ones of the control flow shown in FIG. 3 when a foreign substance is placed on the coordinate input unit 1. In FIG. 4A, a value of the ADC signal when an operation body or a foreign substance is touched to the coordinate input unit is exemplified as 768, a first-time value of the reference value (BASE) is exemplified as 256, and the touch threshold (T_ON) is exemplified as 448.

In step S11, the difference value (DIF_AD) and the touch threshold (T_ON) of the reference for determining the presence or absence of a touch for the input operation to the input device 100 may be compared with each other again. However, as mentioned above, since a foreign substance is placed, the difference value (DIF_AD) becomes larger than the touch threshold (T_ON), and the process proceeds to step S12.

In step S12, the weight (WEIGHT) of the weighted average may be set to be large (16 in the present example), and the process may proceed to step S16. The new reference value (N_BASE) may be calculated on the basis of (Expression 1) using the set weight (WEIGHT) of the weighted average.

When the state where a foreign substance is placed on the coordinate input unit 1 is continued, the state where the value of the ADC signal corresponding to the same capacitance detection unit 1a is large is continued. Therefore, as shown in FIG. 4A, the value of the reference value (BASE) may be updated at each constant time, the value of the reference value (BASE) may be continuously updated to a large value to thereby come close to the AD value, and thus finally, the reference value (BASE) may be consistent with the AD value.

When the value of the reference value (BASE) is continuously updated to a large value to thereby come close to the AD value, and the difference value (DIF_AD) becomes smaller than the touch threshold (T_ON) (the fourth time in a case of FIG. 4A), the process may proceed to step S8 at the time of comparing the difference value (DIF_AD) with the touch threshold (T_ON) in step S6, and a function code corresponding to coordinate information due to malfunction is stopped. Therefore, it may be possible to output a function code indicating a non-touch as a control signal from the control unit 3 to the interface unit 4, and to automatically return from a malfunction state.

Thereby, the continuation of the operation of an apparatus in accordance with a function allocated to a location on which a foreign substance is placed can be stopped until the foreign substance is placed and then returned, or a function capable of normally performing an input operation to other than the location on which the foreign substance is placed can be realized.

Next, reference will be made to FIG. 3 and FIGS. 4A and 4B to describe operations when a foreign substance is placed on the coordinate input unit 1, and the foreign substance is removed after the reference value (BASE) is continuously updated by the weighted average.

FIG. 4B shows the transitions of arithmetic operation results of the AD value, the reference value (BASE), the difference value (DIF_AD), and the new reference value (N_BASE) of the control unit 3 based on the number of processes of step S11 and subsequent ones of the control flow shown in FIG. 3 when a foreign substance is placed on the coordinate input unit 1, and the foreign substance is removed after the reference value (BASE) is continuously updated by the weighted average. In FIG. 4B, a value of the ADC signal when an operation body or a foreign substance is touched to the input unit is exemplified as 768, a value of the ADC signal when an operation body or a foreign substance is not touched to the input unit is exemplified as 256, a first-time value of the reference value (BASE) is exemplified as 768, the touch threshold (T_ON) is exemplified as 448, and the abnormal correction detection threshold (M_OFF) is exemplified as 0.

As mentioned above, in a state where the foreign substance is placed on the coordinate input unit 1, the reference value (BASE) becomes larger than in a state where the foreign substance is not touched to the coordinate input unit 1, and a touch detection due to the foreign substance is not output.

When the foreign substance is removed from the coordinate input unit 1 in the above-mentioned state (the third time in FIG. 4B), the capacitance of the capacitance detection unit 1a located in the vicinity of the coordinates on which the foreign substance is placed may be reduced by the removal of the foreign substance.

Therefore, the value of the ADC signal acquired in step S1 by the control unit 3 also decreases in accordance with the capacitance measured in the capacitance measurement unit 2. The value thereof may be converted to the AD value which is a measurement signal by a noise elimination process or the like in step S2. In step S3, the AD value may be stored in a measurement signal storage area corresponding to coordinate information for each of the plurality of capacitance detection units 1a, but the AD value also decreases in accordance with the value of the ADC signal.

In step S4, the difference between the AD value and the stored reference value (BASE) may be calculated as the difference value (DIF_AD) which is a data signal. In step S5, the difference value (DIF_AD) calculated in step S4 may be stored in a data signal storage area corresponding to coordinate information for each of the plurality of capacitance detection units 1a.

In step S6, the difference value (DIF_AD) and the touch threshold (T_ON) of a reference for determining the presence or absence of a touch for an input operation to the input device 100 are compared with each other.

Since the AD value is reduced, the value of the difference value (DIF_AD) may become a negative numerical value, and may become smaller than the touch threshold (T_ON). Therefore, in step S8, a function code indicating a non-touch is output as a control signal from the control unit 3 to the interface unit 4, and the process proceeds to step S9.

In step S9, 1 may be added to a value of a time interval counter (INTV) measuring a time interval for updating the reference value (BASE). In step S10, it is determined whether the value of the time interval counter (INTV) reaches a value indicating a specified time interval. When the value of the time interval counter (INTV) reaches the value indicating of the specified time interval, the process proceeds to step S11.

In step S11, the difference value (DIF_AD) and the touch threshold (T_ON) of the reference for determining the presence or absence of a touch for the input operation to the input device 100 are compared with each other again. However, as mentioned above, since a foreign substance is removed, the value of the difference value (DIF_AD) becomes smaller than the touch threshold (T_ON), and the process proceeds to step S13.

In step S13, the difference value (DIF_AD) and the abnormal correction detection threshold (M_OFF) may be compared with each other. However, since the value of the difference value (DIF_AD) becomes negative and is smaller than the abnormal correction detection threshold (M_OFF), the process may proceed to step S14.

In step S14, a weight (WEIGHT) of a weighted average when the new reference value (N_BASE) is calculated may be set to be small (1 in the present example). The process may proceed to step S16, and the new reference value (N_BASE) may be calculated on the basis of (Expression 1) using the set weight (WEIGHT) of the weighted average.

In step S14, since the weight (WEIGHT) of the weighted average when the new reference value (N_BASE) is calculated is set to be small (1 in the present example), the new reference value (N_BASE) calculated in step S16 may be quickly updated (the third time and subsequent ones in the case of FIG. 4B) as shown in FIG. 4B, and can be set to correspond to the next operation.

As described above, according to various embodiments, the input device 100 may include the coordinate input unit 1, having a plurality of capacitance detection units 1a, which may cause an operation body to perform a proximity operation, the capacitance measurement unit 2 that may measure capacitance for each of the plurality of capacitance detection units 1a, and perform an AD conversion on the measured capacitance to output the converted capacitance as a measurement signal, and the control unit 3 that may control the capacitance measurement unit 2, calculate a data signal by arithmetically operating the measurement signal, store the data signal in association with coordinate information of the capacitance detection unit 1a, and output a control signal on the basis of a result of the arithmetic operation. The control unit 3 may calculate a difference value between a predetermined reference value and a data signal at a constant time interval, and perform a weighted average process on the data signal and the predetermined reference value to update and store a value on which the weighted average process is performed as a new reference value. Therefore, when a foreign substance or the like is placed on the coordinate input unit 1, the reference value may be continuously corrected by a weighted average, and the reference value may come close to a value of the data signal, thereby allowing an output signal due to an erroneous detection to be stopped. In addition, since a weight given to the weighted average process is changed in accordance with the difference value, the stabilization of the reference value may be achieved by increasing the weighting of the weighted average at the time of the touch detection. When the reference value continuously corrected is required to be reset by placing a foreign substance on the coordinate input unit 1 and removing the foreign substance after the reference value may be continuously updated through the weighted average, the reference value can be reset in a short period of time by decreasing the weighting of the weighted average, and thus it is possible to return to a normal operation quickly.

The weight (WEIGHT) of the weighted average may be divided into at least three magnitudes of a large value (16 in the present example), a small value (1 in the present example), and an intermediate value (8 in the present example) between the large value and the small value, and the control unit 3 may compare the predetermined reference value with the data signal, obtain a difference value therebetween, and determine a weight on the basis of a result obtained by comparing this difference value with the touch threshold. Therefore, it may be possible to change a speed at which the reference value is updated in accordance with the detected state.

Since the weight is determined on the basis of the result of comparing the difference value with the touch threshold and the abnormal correction detection threshold, the speed at which the reference value is updated can be appropriately set on the basis of the operation situation. When the difference value is larger than the touch threshold, the weight increases. Therefore, even when a slow operation is performed, it may be possible to perform a touch input operation stably. In addition, when the difference value is smaller than the touch threshold, the weight may be determined on the basis of a result obtained by comparing the difference value with the abnormal correction detection threshold. Therefore, it may be possible to change the speed at which the reference value is updated in accordance with a process when an abnormality correction is detected. When the difference value is smaller than the abnormal correction detection threshold, the weight decreases. Therefore, it may be possible to reset the reference value in a short period of time, and to return to a normal operation quickly.

As stated above, it is possible to provide an input device capable of returning from an erroneous detection due to a foreign substance or the like.

As stated above, although the input device 100 according to various embodiments, the disclosure invention is not limited to the above-mentioned embodiments, but may be modified and carried out without departing from the scope of the present disclosure. For example, the present invention may be modified and carried out as follows, and such embodiments also belong to the technical scope of the present invention.

(1) In the various embodiments, an example in which the input device 100 and the external apparatus 5 are connected to each other through the interface unit 4 has been described, but the control unit 3 and the external apparatus 5 may be directly connected to each other without including the interface unit 4.

(2) In the various embodiments, data used in the control unit 3 has been described by providing specific numerical values, but a value may be appropriately changed and implemented in accordance with an incorporated apparatus or a use state to be assumed.

(3) In the various embodiments, a case has been described in which the weight of the weighted average is divided into three magnitudes of a large value, a small value, and an intermediate value between the large value and the small value, the larger number of values may be set in accordance with an apparatus to be used, an actual operation state or the like.

It should be understood by those skilled in the art that various modifications, combinations, sub-combinations and alterations may occur depending on design requirements and other factors insofar as they are within the scope of the appended claims of the equivalents thereof.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. An input device comprising:
    a coordinate input unit, having a plurality of capacitance detection units, which causes an operation body to perform a proximity operation;
    a capacitance measurement unit that measures capacitance for each of the plurality of capacitance detection units, and performs an AD conversion on the measured capacitance to output the converted capacitance as a measurement signal; and
    a control unit that controls the capacitance measurement unit, calculates a data signal by arithmetically operating the measurement signal, stores the data signal in association with coordinate information of the capacitance detection unit, and outputs a control signal on the basis of a result of the arithmetic operation,
    wherein the control unit calculates a difference value between a predetermined reference value and the data signal at a constant time interval, performs a weighted average process on the data signal and the predetermined reference value to update and store a value on which the weighted average process is performed as a new reference value, and changes a weight given to the weighted average process in accordance with the difference value, and
    wherein the weight is divided into at least three magnitudes, and the weight is determined on the basis of a result obtained by comparing the difference value with a touch threshold.

2. The input device according to claim 1, wherein the weight is set to be large when the difference value is larger than the touch threshold, the difference value is compared with an abnormal correction detection threshold when the difference value is smaller than the touch threshold, and the weight is set to be small when the difference value is smaller than the abnormal correction detection threshold.

* * * * *